UNITED STATES PATENT OFFICE.

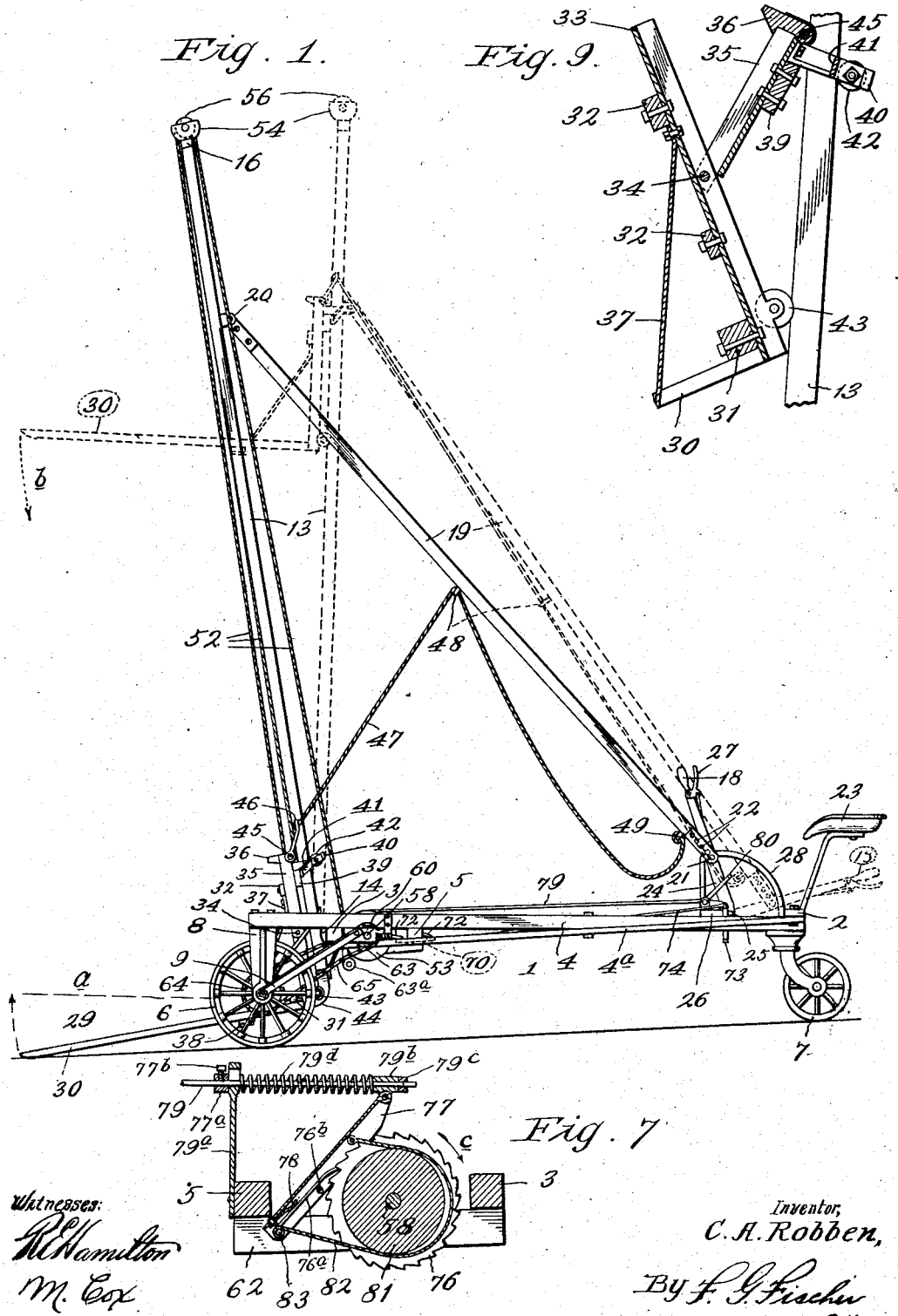

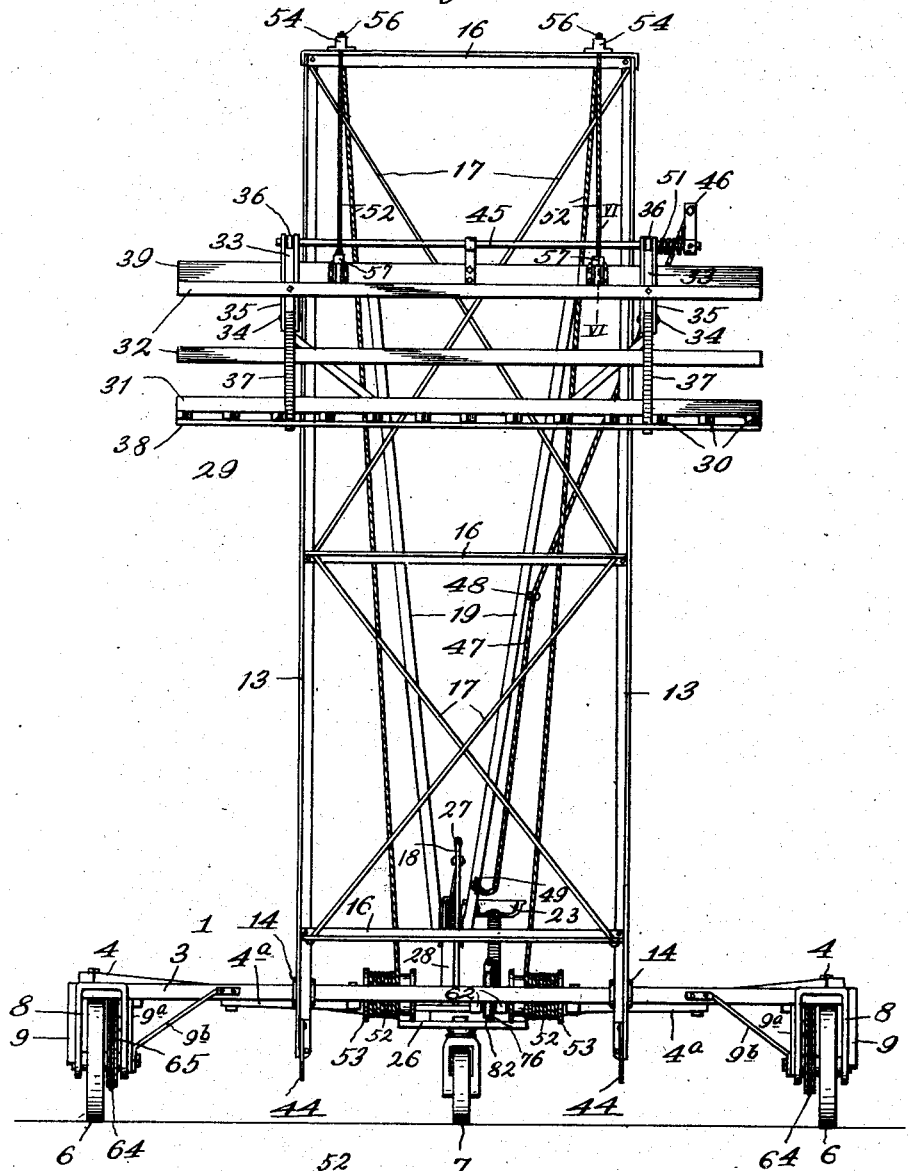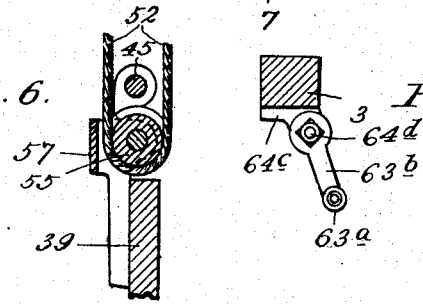

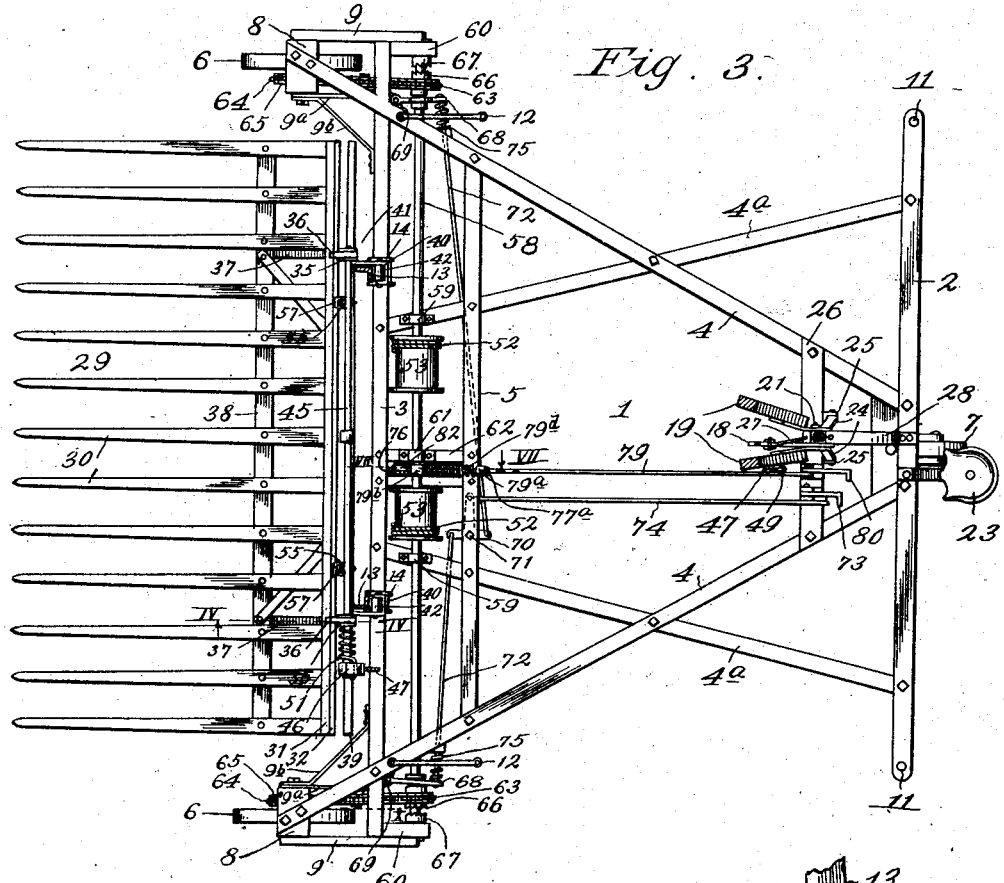

CLEMENS A. ROBBEN, OF ANGELUS, KANSAS.

COMBINED HAY RAKE AND STACKER.

973,813.   Specification of Letters Patent.   Patented Oct. 25, 1910.

Application filed December 31, 1909. Serial No. 535,877.

*To all whom it may concern:*

Be it known that I, CLEMENS A. ROBBEN, citizen of the United States, residing at Angelus, in the county of Sheridan and State of Kansas, have invented certain new and useful Improvements in Combined Hay Rakes and Stackers, of which the following is a specification.

My invention relates to improvements in combined hay-rakes and stackers, and is an improvement over my United States Letters Patent No. 938,076, granted October 26, 1909.

Referring to the accompanying drawings, which illustrate the invention: Figure 1 is a side elevation of the machine in full lines ready to gather hay, and in dotted lines with the rake elevated preparatory to dumping. Figs. 2 and 3 are front and plan views, respectively, the standards, forming part of the machine, being shown in section in Fig. 3. Fig. 4 is an enlarged section on line IV—IV of Fig. 3. Fig. 5 is a section on line V—V of Fig. 4. Fig. 6 is a section on line VI—VI of Fig. 2. Fig. 7 is a section on line VII—VII of Fig. 3, showing a combined ratchet- and - brake mechanism employed in controlling the rake. Fig. 8 is a detail of a self-locking foot-lever employed in carrying out the invention. Fig. 9 is a broken vertical section of the rake in a dumping position. Fig. 10 is a section on line X of Fig. 3, showing an idler employed in carrying out the invention.

In carrying out the invention, I employ a frame 1, comprising a rear bar 2, a front bar 3, a pair of forwardly-diverging-bars 4, resting at their forward portions upon bar 3, forwardly-converging bars 4$^a$ extending beneath bars 3 and 4, and a transverse brace 5 secured to the underside of bars 4 and the upper side of bars 4$^a$. Bars 4 and 4$^a$ are secured to the underside of bars 2 and 4 and the upper side of bars 4$^a$. Frame 1 is mounted at its forward end upon a pair of wheels 6, and at its rear end upon a caster 7, whereby the machine may be guided. Wheels 6 are mounted in a pair of yokes 8, depending from the forward ends of the diverging bars 4, and reinforced by rearwardly and upwardly-extending braces 9, secured to bearing 60 extending rearwardly from bar 3. Yokes 8 are further reinforced by braces 9$^a$ and 9$^b$ extending therefrom to bar 3. Bar 2 has holes 11 at its ends for the reception of a pair of swingle-trees, not shown, and bars 4 are provided with rearwardly-extending rods 12, said rods and swingle-trees providing means to which a team may be hitched for propelling the machine.

13 designates a pair of standards which are tiltably mounted on bar 3, said bar being provided with a pair of flanged sleeves 14 to receive the upper curved ends of a pair of hangers 15, secured to the rear lower portions of the standards. Standards 13 are united by transverse bars 16, and securely braced by a plurality of diagonal rods 17.

The standards are tilted to the positions shown in Fig. 1, by means of a hand-lever 18 and a pair of connecting-bars 19, secured at their upper ends to a pair of lugs 20 and adjustably connected to the lever by a bolt 21, adapted to engage any of the holes 22 in said connecting-bars, and thereby normally give more or less pitch to the standards. Lever 18 is arranged adjacent to the seat 23, and its lower bifurcated end 24 is pivotally connected to lugs 25 extending rearwardly from a transverse plank 26 on the diverging bars 4. Lever 18 is provided with a latch 27, which coöperates with a segment 28 in locking said lever in any of its adjusted positions.

29 designates the rake, which is arranged to travel up and down on the standards. Said rake comprises a plurality of teeth 30, connected at their rear ends to a rake-head consisting of a beam 31, and slats 32, secured to a pair of jointed bar members 33, pivotally secured near their central portions by rivets 34 to the lower terminals of another pair of jointed bar members 35, which are U-shaped in cross section to receive the upper portions of members 33, wherein said upper portions are normally held by a pair of latches 36, see Fig. 4. Slats 32 prevent the hay from moving backward against standards 13 and becoming entangled with brackets 40 and rollers 42 hereinafter referred to. Members 33 are reinforced by braces 37 secured at their lower terminals to a slat 38, secured to the undersides of the rake-teeth. Members 35 are united by a transverse slat 39, and provided with the rearwardly-extending brackets 40 which are reinforced with braces 41, and carry the antifriction rollers 42 which travel on the standards, and with the assistance of the guard and a pair of antifriction rollers 43, hold the rake in position on the standards. Rollers 43 are adapted to rest in pockets formed by the upturned terminals 44 of the lower ends of the standards, and thereby support the rake in its lowermost position.

Latches 36 are fixed to the ends of a transverse rod 45 pivotally-mounted in the upper bifurcated ends of members 35, and provided at one end with a lever 46, to which the forward end of an operable-cable 47 is attached. Said cable extends upward through an eye 48, and is attached at its rear terminal to an eye 49, both of said eyes being secured to the connecting-bars 19. Latches 36 are normally held in engagement with the upper ends of members 33 by a coil-spring 51, encircling one end of rod 45 and secured at its ends to the adjacent member 35 and lever 46, Figs. 2 and 3.

The rake is raised and lowered by a pair of cables 52 and a pair of drums 53, to which latter the lower ends of the cables are attached. The upper ends of the cables 52 are attached to a pair of hoods 54, from which they extend downward beneath a pair of sheaves 55, thence upward around a pair of sheaves 56, and thence downward to the drums. Sheaves 56 are mounted in the hoods 54, which are attached to the uppermost bar 16, and sheaves 55 are mounted in a pair of hoods 57 secured to the uppermost slat 39 of the guard. Drums 53 are fixed upon a transverse shaft 58, journaled in bearings 60. Shaft 58 is also journaled in bearings 59 on the upperside of the forwardly-converging bars 4$^a$, and a bearing 61 on the upperside of one of the braces 62, which extend beneath shaft 58 and are secured to the underside of bars 3 and 5. Shaft 58 is provided near its ends with a pair of loosely-mounted sprocket-wheels 63, which are driven by a pair of sprocket-wheels 64, through the intermediacy of endless sprocket-chains 65. Slack in the sprocket-chains is taken up by idlers 63$^a$, carried by hangers 63$^b$, adjustably secured to bearings 64$^c$ by bolts 64$^d$. Bearings 64$^c$ are secured to the underside of bar 3.

Sprocket-wheels 64 are fixed to the hubs of wheels 6, to rotate therewith, and sprocket-wheels 63 are provided with clutch-members 66 adapted to engage a pair of clutch-members 67 fixed to shaft 58, and thereby rotate the same. The sprocket-wheels 63 are shifted to throw their clutch-members 66 into engagement with clutch-members 67 by a pair of shifting-levers 68, pivoted to lugs 69, a T-lever 70 fulcrumed upon a pin 71, connecting-rods 72 connecting the shifting-levers 68 with the T-lever 70, a foot-lever 73 mounted on plank 26, and a connecting-rod 74 secured at its ends to the T-lever and said foot-lever. Foot-lever 73 is self-locking, and thus normally holds clutch-members 66 out of engagement with the clutch-members 67 against the action of a pair of expansion springs 75, interposed between the free ends of the shifting-levers 68 and the adjacent sides of bars 4.

The rake is held at any desired elevation by a ratchet-wheel 76, Fig. 7, fixed upon shaft 58, and a pawl 76$^a$, which is normally held in engagement with the ratchet-wheel by a spring 78. Pawl 76$^a$ is disengaged from the ratchet-wheel through the intermediacy of a lever 77, provided with a transverse pin 76$^b$ underlying the pawl to lift the same out of engagement with the ratchet-wheel, when lever 77 is drawn backwardly. Lever 77 is actuated by a connecting-rod 79 secured at its rear end to a foot-lever 80 supported by plank 26 within convenient reach of the driver. The forward end of the connecting-rod 79 extends loosely through a guide 79$^a$ on bar 5 and a sleeve 79$^b$ pivotally secured to the upper end of lever 77, said connecting-rod being provided with a fixed collar 79$^c$ to prevent its withdrawal from the sleeve. Lever 77 is normally held in forward position by an expansion spring 79$^d$ embracing the connecting-rod 79 and interposed between guide 79$^a$ and sleeve 79$^b$. Said spring permits lever 77 to vibrate when ratchet-wheel 76 rotates backwardly in the direction of arrow $c$ to allow the rake to descend, without vibrating rod 79 and lever 80. The forward movement of lever 77 is limited by a collar 77$^a$ adapted to abut against the rear side of guide 79$^a$, and adjustably secured to rod 79 by a set-screw 77$^b$. The speed at which the rake descends is governed by a brake, comprising a drum 81 on one side of the ratchet-wheel, and a band 82 attached at its ends to the free end of lever 77 and its pivotal point 83, which also carries pawl 76$^a$. When the pawl is disengaged from the ratchet-wheel, band 82 frictionally engages the drum 81 and thereby retards its movement.

Having thus described my invention, what I claim is:—

A machine of the character described, consisting of a wheeled-frame, standards tiltably-mounted thereon, a rake having vertical movement on said standards, drums geared to the wheels of the frame, cables for actuating the rake attached at their ends to the standards and the drums and having a running connection with said standards and the rake, manually-operable means for throwing the drums out of gear, a connecting-rod, a guide through which said connecting-rod extends, a sleeve through which the connecting-rod loosely extends, an expansion spring interposed between one end of said sleeve and the guide, a collar abutting against the other end of the sleeve and secured to the connecting-rod, a lever fulcrumed at its lower end to the wheeled-frame and pivotally-connected at its upper end to the sleeve, a pawl actuated by said lever, a ratchet-wheel engaging the pawl to lock the drums when thrown out of gear with the wheels, a drum fixed to said ratchet-wheel, and a band encircling the last-mentioned drum and connected to the lever to retard the rotation of the last-mentioned drum when lowering the rake.

In testimony whereof I affix my signature, in the presence of two witnesses.

CLEMENS A. ROBBEN.

Witnesses:
E. A. COURTNEY,
J. E. BORAH.